Oct. 17, 1961 G. L. LANG 3,004,453
GEARLESS SPEED REDUCTION MECHANISM
Filed June 24, 1957 3 Sheets-Sheet 1

INVENTOR.
GREGOR L. LANG
BY
ATTORNEY

INVENTOR.
GREGOR L. LANG
ATTORNEY.

Oct. 17, 1961 G. L. LANG 3,004,453
GEARLESS SPEED REDUCTION MECHANISM
Filed June 24, 1957 3 Sheets-Sheet 3
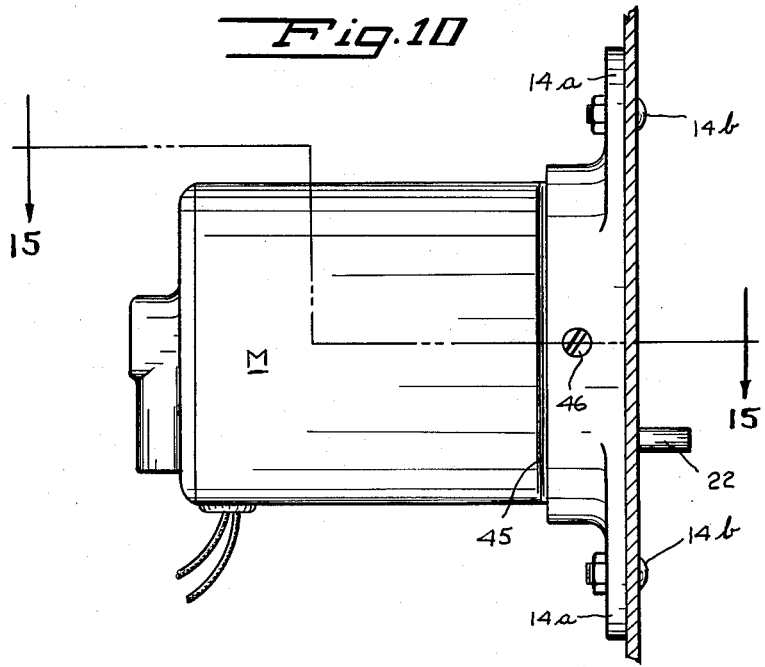
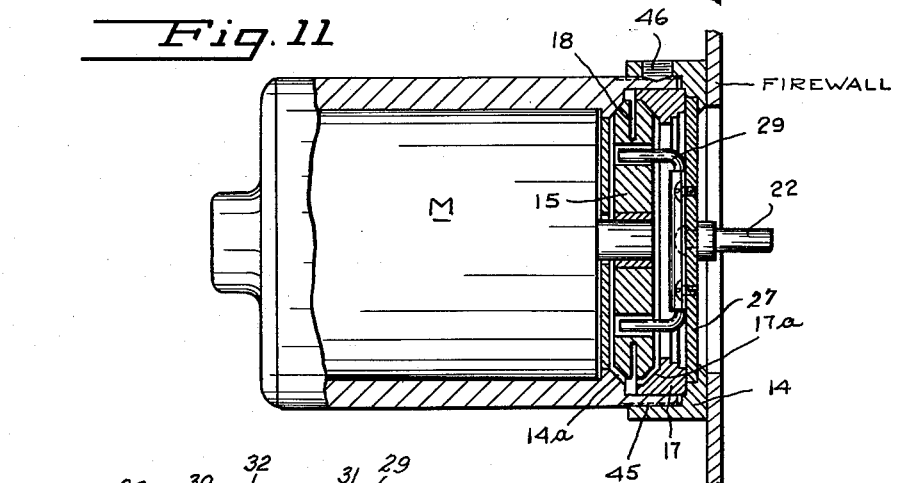
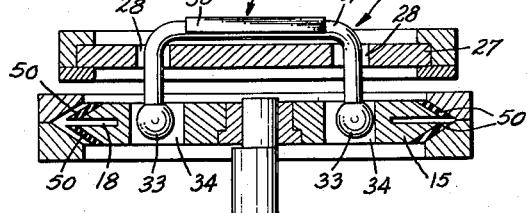
INVENTOR.
GREGOR L. LANG
BY
*Raymond A. Paquin*
ATTORNEY.

United States Patent Office 3,004,453
Patented Oct. 17, 1961

3,004,453
GEARLESS SPEED REDUCTION MECHANISM
Gregor L. Lang, East St., Suffield, Conn.
Filed June 24, 1957, Ser. No. 667,513
11 Claims. (Cl. 74—798)

This invention relates to a new and improved gearless speed reducing mechanism of the fixed ratio type.

This application is a continuation in part of my application Serial Number 366,159, filed July 6, 1953, now abandoned, which was a division of my application, Serial Number 185,255, filed September 16, 1950, now Patent Number 2,656,737.

An object of the invention is to provide such a mechanism with which reduction ratios ranging between 21 to 1 and 1000 to 1 or 100,000 to 1 or more may be obtained with only two moving parts by slight changes in some of the principal dimensions.

Another object of the invention is to provide such a mechanism which is relatively simple and economical in construction yet efficient in operation.

Another object is to provide such a mechanism which possesses ample torque handling capacity for most low power applications of high ratio reduction units and which is inherently quieter than gear reduction systems and which lends itself to mass production method of manufacture and is inherently less expensive to produce than gear systems of comparable ratios and torque capacity.

Another object is to produce such a mechanism which is applicable, in various executions, to use in countless devices which are operated at much lower revolving speeds than the motor or shaft which drives them, for example, motor driven sign flasher switches, time delay units, phonograph turn-tables, high ratio radio tuning controls, motor driven windshield wipers, industrial program or control timers, and reduction drives for low speed shop tools such as wet grinding wheels, store window display turntables and numerous other uses.

Another object of the invention is to provide a means of maintaining a rotating member and a gyrating member in fixed angular relationship.

Other objects and advantages of the invention will be apparent from the following description taken in connection with the accompanying drawings. It will be understood that changes may be made in the details of construction and arrangement of parts as the preferred forms of the invention have been given by way of illustration only.

Referring to the drawings:

FIGS. 10 and 11 show the invention applied to a windshield wiper for a motor vehicle; and FIG. 12 is a view generally similar to FIG. 6 but showing a modified form of the invention.

Figure 1:
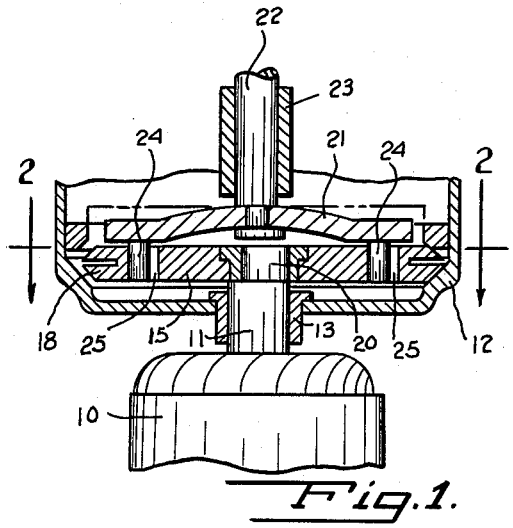
FIG. 1 is a sectional view of a speed reduction system embodying the invention.
Figure 2:
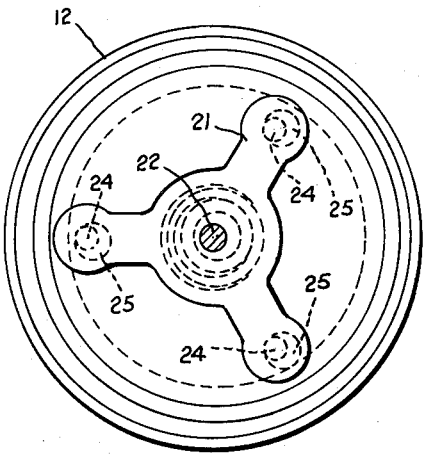
FIG. 2 is a sectional view taken on line 2—2 of FIG. 1, looking in the direction of the arrows.
Figure 3:
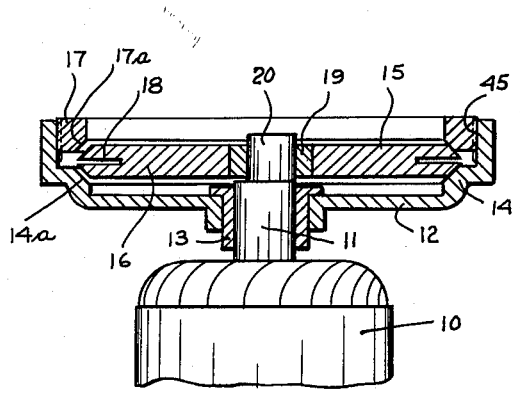
FIG. 3 is a sectional view generally similar to FIG. 1, and showing the V track assembly.

Referring more particularly to the drawings wherein similar reference characters designate corresponding parts throughout, the form of the invention shown in FIGS. 1 through 3 comprises a motor armature 10 adapted to drive shaft 11 on which is carried the cupped casing 12 having bearing sleeve 13 press fitted into a central opening in casing 12 coaxial with the friction track hereinafter described.

Casing 12 is cupshaped, as previously stated, and is provided with shoulder 14 forming a friction track 14a adapted to engage one side of the V-shaped edge 16 of disc 15 which may be of Micarta or other suitable material and has the opposite surfaces of its V-shaped edge 16 engaging a track 14a on shoulder 14 and a track on ring 17 and said V-shaped edge 16 is held in tight frictional engagement therebetween. Disc 15 may be made of properly resilient material or formed with a peripheral slot 18 in its edge as shown which provides a simple and inexpensive means of establishing a spring loading effect which functions to maintain the cooperating friction faces in tight frictional engagement. It will be understood that disc 15 could be held in tight frictional engagement by loading springs applied to the upper friction track or a split or spring-loaded gyrating disc could be employed or disc 15 might be comprised of two saucer shaped metal discs, properly contoured at their edges and assembled together with an appropriate bearing member at the center.

Disc 15 is mounted on a bearing 19 which is mounted on an eccentric or crank end 20 on shaft 11.

The motion of the gyrating disc of the type described is not pure, smooth rotary motion, but it is technically spoken of as cycloidal, which is a combination of smooth rotary motion, and harmonic radial motion. A given point on the pitch line of the inner disc will describe a series of cusp-like cycloids as it progresses around the pitch line of the friction track.

For most speed reduction applications it is necessary to translate the motion of the gyrating disc, so as to permit power take-off by an auxiliary rotating shaft or disc, so arranged as to be positively driven by the rotary component only, of the cycloidal motion, while discarding or ignoring the radial component of this motion.

One method of accomplishing this smooth rotary power take-off from the gyrating disc is the use of a crow's-foot translator plate 21 which is secured to shaft 22 having stationary bearing 23. Translator plate 21 has three axial drive pins 24 engaging in three oversize holes 25 in disc 15. Pins 24 must be so located on crow's-foot member 21 that their centers coincide in spacing and angular relationship with the centers of the oversize holes 25 in friction disc 15. These holes 25 in disc 15 must be larger than the pins 24 by a diametral amount which is equal to or slightly more than the full throw of the eccentric crank, that is, double the throw radius of the crank.

As the friction disc 15 gyrates around in its cycloidal path, the effect of the oversized holes 25 is to wipe or slide once around the pins for each rotation of the crank. The geometrical effect of this arrangement is that at least one pin is always in a pressure or driving position relative to the hole in the disc which drives it. As the disc 15 gyrates, its rotary component of motion is transmitted to the crow's-foot 21 in a smoothly transferring sequence in which the rotary drive is imparted to the pins in a smooth sequence, one after the other, with each of the pins carrying the driving load during a portion of the drive shaft rotation. Some flexibility of mounting of the pins on the crow's-foot might be desirable to eliminate noise due to slight inaccuracies in machining.

The coefficient of friction might be modified or improved with corresponding variations in tractions by applying material such as high friction belt dressing to the friction disc 15 and track surfaces, or by making one of the cooperating friction faces of a resilient high friction material such as cork. This would also improve the spring loading effect.

Adjustable means may be provided for adjusting the compression of the disc in the track such as by making the track halves relatively adjustable as by a threaded connection.

Figure 5:
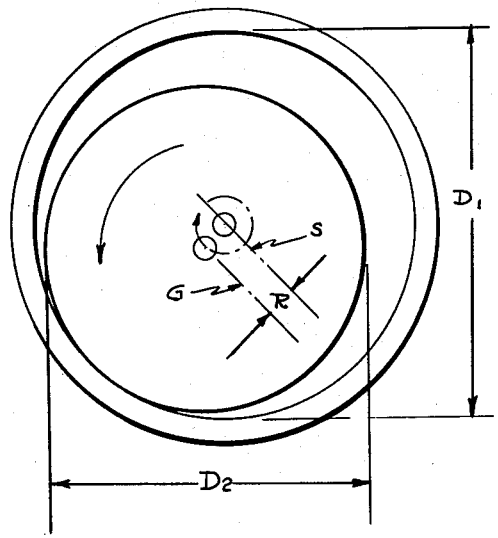
FIG. 5 is a view illustrating the principle of the invention.

The fundamental theory of the present invention, as will be seen from FIG. 5, depends upon the fact that a flat uncrowned pulley may be pressed radially outward against the inside face of an outer "universe" or ring pulley, and when rotated eccentrically about a radius of gyration such as to maintain contact between the inner pulley and the outer ring, will rotate slowly, or at a rate which is equal to $$N\left(\frac{d_1-d_2}{d_1}\right)$$

where N is the drive shaft or eccentric crank rate of rotation, $d_1$ is the inside diameter of the outer ring or "universe ring," and $d_2$ is the outside diameter of the inner or ecentrically gyrating pulley.

It will be noted that as the crank is rotated clockwise, and pulley correspondingly gyrates clockwise, that the pulley will actually rotate about its own center in a counter-clockwise direction.

In FIG. 5, R is the radius of gyration or crank throw which equals one half of $D_1-D_2$. G is the center of the gyrating "planet" pulley and S is the center of the drive shaft.

It will be noticed that the more nearly $D_2$ approaches $D_1$, the smaller the radius of gyration will be, and the higher the differential ratio will be, the smaller the radius of the crank or eccentric drive shaft will be, and the greater the number of crank rotations which will be required to complete one revolution of the planet pulley. As $D_2$ approaches $D_1$, and the reduction ratio becomes higher, the greater is the effective friction area brought into contact between the ring and pulley, and the greater would be the torque or load capable of being driven by the system. The V track or angular cooperating pulley faces together with spring loading serve to increase the tractive effort of the mechanism and additionally aid in eliminating the small eccentricities due to manufacturing inaccuracies.

Figure 4:
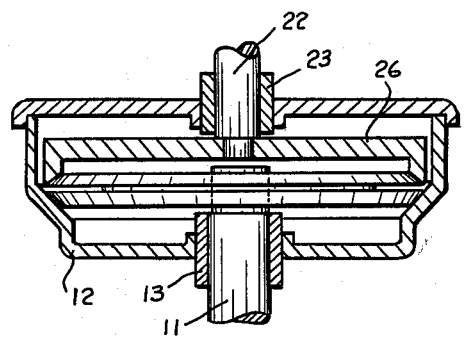
FIG. 4 is a sectional view, generally similar to FIG. 1, but showing an extreme ratio form of the invention.

In the form of the invention shown in FIG. 4, which is an extreme ratio friction reduction drive and is adapted to produce extreme reduction ratios of perhaps 100,000 to 1 in either forward or reverse direction, by a simple form which does not require a translator type power take-off.

In this form the upper half of the friction track 26 is rotatable and is attached to the low speed output shaft. The lower half is similar to that described in connection with FIGS. 1 through 3. The method lies in so cutting or forming the friction track of the friction disc, that the effective pitch diameters of the two sides are slightly different. This will cause a slight differential travel or differential pitch line length between the two friction track halves. Considerable torque can thus be handled. As the two effective pitch diameters more nearly coincide or approach an identical dimension, the more nearly the reduction ratio approaches infinity, and the slower the low speed shaft will turn for a given rate of rotation of the high speed shaft.

The direction of rotation is determined by the choice of diameters of the two friction track halves, or depends upon which is larger than the other in pitch diameter. The ratio may be varied somewhat by making either side of the outer friction track axially adjustable and thus compressing the friction disc more or less to vary the effective pitch diameter of one side.

Figure 6:
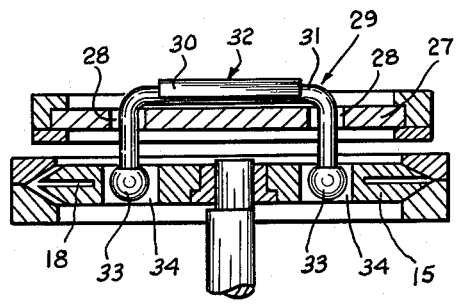
FIG. 6 is a sectional view, similar to FIG. 1, but showing another form of motion translation mechanism.
Figure 7:
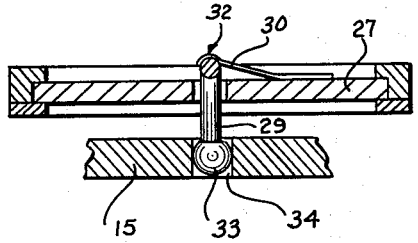
FIG. 7 is another view of the mechanism shown in FIG. 6, but taken at right angles to FIG. 6.

In the form of the invention shown in FIGS. 6 and 7, another motion translating mechanism is employed. In this form there is loosely retained in plate 27 by holes 28 a substantially U-shaped stiff wire member 29 which projects through holes 28 in plate 27. Member 29 may be floatingly retained by holes 28 in plate 27 or it may be retained in position by a hinge or bearing means such as sheet spring hinge 30 which is attached to wire 29 and engages plate 27. This spring hinge 30 is such as to allow a slight freedom or rocking motion of part 31, pivoting substantially at point 32.

The lower ends of wire member 29 are provided with properly shaped ball portions 33 which slidingly engage in elongated holes 34, in the gyrating friction disc member 15. The holes 34 will be seen to be elongated only in one plane or direction as shown in FIG. 6. In the other plane, as shown in FIG. 7, the holes 34 are a close but free running fit which allows ball ends 33 a slight sliding freedom in the direction of the elongated openings 34 as shown in FIG. 6. The gyrating disc 15 is caused to gyrate and rotate about the inner faces of the stationary friction track members 14a and 17a by the eccentric action of crank 20 which rotates in bearing 19.

The rotary component of the force or motion of the friction disc 15 will be seen to be transmitted to plate 27 by imparting to wire member 29 a twisting force such that the ball ends 33 are forced in opposite directions.

The radial component of the gyrating or epicyclic motion of disc 15 is eliminated or "washed out" by the alternate and consecutive bringing into play of the two perpendicular modes of freedom enjoyed by member 29 relative to plate 27 and disc 15. During one portion of rotation, ball ends 33 slide in elongated holes 34 and during a subsequent part of rotation, which is aproximately ninety degrees displaced the ball ends 33 will be relatively stationary in holes 34 and instead wire 29 will rock slightly about an axis formed by the attachment point to spring 30 at 32.

If desired spring 29 might both rock and slide in a hinge or bearing at point 32 and thus eliminate the elongation of holes 34.

Figure 8:
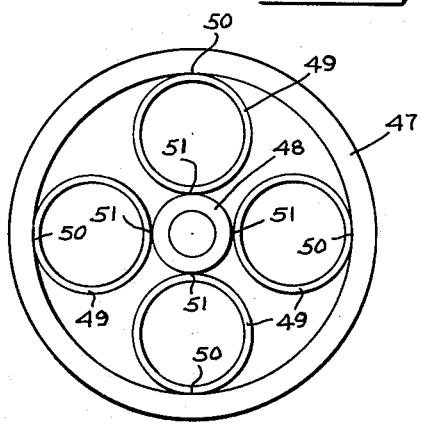
FIGS. 8 and 9 show modified forms of friction disc.
Figure 9:
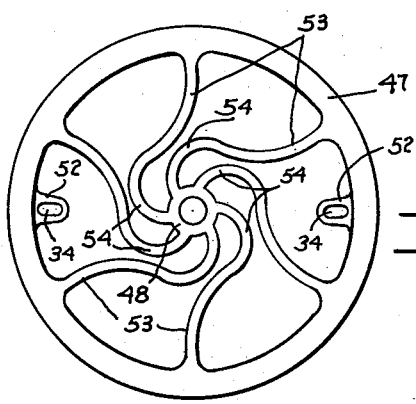

In the form of the friction disc shown in FIG. 8, the disc is formed with a rim 47 having a friction periphery and a hub 48 connected to rim 47 by a plurality of resilient rings 49 which engage rim 47 at 50 and hub 48 at 51. The lugs 34 having slots 34 for the ends 33 of translator 29 would be provided as shown in the form of FIG. 9. The hub 48, rim 47 with lugs 52 and rings 49 could be formed integral by stamping or punching if the disc were made of metal or they could be molded of suitable plastic composition such as fibre reinforced phenolic composition. The lugs 52 have not been shown in FIG. 8 but would, of course, be required.

In the form of FIG. 9, the rings 49 of the form of FIG. 8 would be replaced by deformed resilient spokes 53 having the bent or looped portions 54 for providing the required resilience.

In FIGS. 10 and 11 the invention is shown applied to a drive for a windshield wiper for a motor vehicle wherein the motor M is positioned in the engine compartment and the ring 14 is secured to the firewall of the vehicle with the crankpin 22 extending through an opening in the firewall, into the vehicle body, and is adapted to be connected to a drive linkage for a windshield wiper in the conventional manner.

In this form the forward or adjacent end of the motor housing is threaded and adapted to be threadedly connected to a threaded portion on ring 14 at 45 and the set screw 46 prevents loosening of the connection.

The ring 14 is provided with flanges 14a adapted to be secured to the firewall by means of bolts or the like 14b.

In FIG. 12, there is shown a form of the invention generally similar to that of FIG. 6, but in which the disc 15 is provided with a surface 50 of resilient material.

From the above it will be seen that I have provided simple, efficient and economical means for obtaining all of the objects and advantages of the invention.

Having described my invention, I claim:

1. A gearless speed reduction mechanism comprising, a housing, a circular track in said housing, said track having V-shaped faces, a friction disc in said housing, said friction disc having an integral, slotted V-shaped face in said track, said friction disc and track having cooperating adjacent faces with one of said faces being of resilient material and compressably spring loaded relative to the other of said V faces and adjustable means whereby the compression of said disc in said track may be adjusted.

2. A gearless speed reduction mechanism comprising, a housing, a circular track in said housing, said track having V-shaped faces, a friction disc in said housing, said friction disc having an integral V-shaped face in said track, said friction disc and track having cooperating adjacent faces with one of said faces being of resilient material and compressably spring loaded relative to the other of said V faces, said friction disc having a slotted periphery adapted to be compressed by the V-shaped faces on said track and adjustable means whereby the compression of said disc in said track may be adjusted.

3. A speed reduction mechanism comprising, a housing, a circular track in said housing, a friction disc member in said track, a driving member extending into said housing and operatively connected to said friction disc for effecting rotation thereof, said disc member and track having cooperating spaced adjacent faces, said friction disc having an integral slotted periphery of resilient material adapted to be compressed by the face on said track member and adjustable means whereby the compression of said disc in said track may be adjusted.

4. A speed reduction mechanism comprising a driving member and a driven member, a circular track in said housing, and a friction disc in said housing and operatively connected to said members, said track and friction disc having cooperating V-shaped adjacent faces, said friction disc having a slotted periphery adapted to be compressed by the face on the track member and adjustable means whereby the compression of said disc in said track may be adjusted.

5. In a speed reduction mechanism comprising a circular track member, a friction disc member in said track member, said disc member and track member having cooperating shaped adjacent faces, the combination of a driven plate and a U-shaped hinged member carried by said driven plate having its sides extending therethrough and its ends positioned in recesses in said disc, said U-shaped member coupling said driven plate with said disc member and having rocking and sliding freedom.

6. In a speed reduction mechanism comprising a circular track member, a friction disc member in said track member, said disc member and track member having cooperating shaped adjacent faces, the combination of a driven plate and a U-shaped hinged member carried by said plate and having its sides extending therethrough and having ball portions engaging said disc, said U-shaped member coupling said driven plate with said disc member and having rocking and sliding freedom.

7. In a speed reduction mechanism comprising a circular track member, a friction disc member in said track member, said disc member and track member having cooperating shaped adjacent faces, the combination of a driven plate and a U-shaped member carried by said driven plate and having its sides extending therethrough and engaging said disc, said U-shaped member coupling said driven plate with said disc member and having rocking and sliding freedom.

8. In a speed reduction mechanism comprising a circular track member, a friction disc member in said track member, said disc member and track member having cooperating shaped adjacent faces, the combination of a driven plate and a U-shaped member carried by said plate and having its sides extending therethrough and having ball portions engaging said disc, said U-shaped member coupling said driven plate with said disc member and having rocking and sliding freedom.

9. In a speed reduction mechanism comprising a circular track member, a friction disc member in said track member, said disc member and track member having cooperating shaped adjacent faces, the combination of a driven plate and a U-shaped hinged member carried by said driven plate and having its sides extending therethrough and engaging said disc, said U-shaped member coupling said driven plate with said disc member and having rocking and sliding freedom.

10. In a device of the character described, a drive shaft, a track, a friction disc in said track and having an outer periphery of friction material, said friction disc being operatively connected to said drive shaft, said friction disc having a hub for connection to said drive shaft and resilient means connecting said hub and said periphery, said resilient means comprising deformed spokes, a driven disc adapted to be driven by said friction disc and coupling means operatively connecting said friction disc and said driven disc, said coupling means having rocking and sliding freedom.

11. In a device of the character described, a drive shaft, a track, a friction disc in said track and having an outer periphery of friction material, said friction disc being operatively connected to said drive shaft, said friction disc having a hub for connection to said drive shaft and resilient means connecting said hub and said periphery, said resilient means comprising annular members connected to said hub and to said periphery, a driven disc adapted to be driven by said friction disc and coupling means operatively connecting said friction disc and said driven disc, said coupling means having rocking and sliding freedom.

References Cited in the file of this patent

UNITED STATES PATENTS

| | | |
|---|---|---|
| 281,528 | Larzelere | July 17, 1883 |
| 457,206 | Meier | Aug. 4, 1891 |
| 885,354 | Loguin | Apr. 21, 1908 |
| 901,080 | Dock | Oct. 13, 1908 |
| 994,539 | Schiek | June 6, 1911 |
| 1,060,073 | Fono | Apr. 29, 1913 |
| 1,453,541 | Beisel | May 1, 1923 |
| 1,910,777 | Soddy | May 23, 1933 |
| 2,014,309 | Brock | Sept. 10, 1935 |
| 2,035,582 | Winger | Mar. 31, 1936 |
| 2,299,247 | Morgan | Oct. 20, 1942 |
| 2,583,496 | Rougelot | Jan. 22, 1952 |
| 2,656,737 | Lang | Oct. 27, 1953 |
| 2,831,373 | Weis | Apr. 22, 1958 |
| 2,868,039 | Lee | Jan. 13, 1959 |

FOREIGN PATENTS

| | | |
|---|---|---|
| 20,237 | Sweden | July 6, 1904 |
| 88,325 | Sweden | Jan. 19, 1937 |
| 248,594 | Switzerland | May 15, 1947 |